US012390905B2

(12) United States Patent
Wypych

(10) Patent No.: US 12,390,905 B2
(45) **Date of Patent: *Aug. 19, 2025**

(54) RATCHET TOOL WITH IMPROVED PAWL

(71) Applicant: Harbor Freight Tools USA, Inc., Calabasas, CA (US)

(72) Inventor: Casper Wypych, Calabasas, CA (US)

(73) Assignee: Harbor Freight Tools USA, Inc., Calabasas, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/723,032

(22) Filed: Apr. 18, 2022

(65) Prior Publication Data

US 2022/0234176 A1 Jul. 28, 2022

Related U.S. Application Data

(63) Continuation of application No. 16/588,490, filed on Sep. 30, 2019, now Pat. No. 11,331,774.

(51) Int. Cl.
*B25B 13/46* (2006.01)

(52) U.S. Cl.
CPC .......... *B25B 13/463* (2013.01); *B25B 13/467* (2013.01)

(58) Field of Classification Search
CPC ............................ B25B 13/463; B25B 13/467
See application file for complete search history.

(56) References Cited

U.S. PATENT DOCUMENTS 2,957,377 A 10/1960 Hare
3,265,171 A 8/1966 Kilness
3,436,992 A 4/1969 Over et al.
3,866,492 A 2/1975 Knoll
4,497,227 A 2/1985 Stasiek
4,903,554 A 2/1990 Colvin
4,934,220 A 6/1990 Slusar et al.
5,495,783 A 3/1996 Slusar et al.
5,533,427 A 7/1996 Chow
5,857,390 A 1/1999 Whiteford
5,913,954 A 6/1999 Arnold et al.
5,921,158 A 7/1999 Slusar et al.
6,044,731 A 4/2000 Hsieh
6,125,722 A 10/2000 Hopper, Jr. et al.
(Continued)

FOREIGN PATENT DOCUMENTS

TW 1551403 10/2016

*Primary Examiner* — Hadi Shakeri

(74) *Attorney, Agent, or Firm* — McAndrews, Held & Malloy, Ltd.

(57) ABSTRACT

A ratchet tool having a head having a first cavity is adapted to receive a cover plate and a second cavity. An aperture extends between the first cavity and the second cavity. Disposed in the first cavity is a ratchet gear and a pawl. A selector switch disposed in the second cavity and moves the pawl between a first position and a second position. A retaining clip retains the selector switch in the second cavity. The retaining clip extends into the first cavity. The pawl includes a first extended portion and a second extended portion extending from a lower end of the pawl. At least a portion of the retaining clip is disposed between the first extended portion and the second extended portion. The first extended portion and the second extended portion contact the lower surface of the first cavity. An upper end of the pawl contacts the cover plate.

12 Claims, 8 Drawing Sheets

(56) References Cited

U.S. PATENT DOCUMENTS

| | | | | |
|---|---|---|---|---|
| 6,230,591 | B1 | 5/2001 | Ling et al. | |
| 6,253,647 | B1 | 7/2001 | Eggert et al. | |
| 6,282,992 | B1 | 9/2001 | Hu | |
| 6,382,052 | B1 * | 5/2002 | Chen | B25B 13/463 81/63 |
| 6,435,063 | B1 * | 8/2002 | Chen | B25B 13/463 81/63.2 |
| 6,450,066 | B1 | 9/2002 | Hu | |
| 6,457,387 | B1 | 10/2002 | Hu | |
| 6,457,388 | B1 | 10/2002 | Chen | |
| 6,601,477 | B2 | 8/2003 | Huang | |
| 6,918,323 | B2 | 7/2005 | Arnold et al. | |
| 7,114,415 | B1 * | 10/2006 | Chiang | B25B 13/463 81/60 |
| 7,185,566 | B2 | 3/2007 | Arnold et al. | |
| 7,207,244 | B2 | 4/2007 | Chen | |
| 7,263,919 | B2 | 9/2007 | Arnold | |
| 7,987,747 | B2 | 8/2011 | Ross et al. | |
| 8,720,308 | B2 | 5/2014 | Hopper et al. | |
| 9,440,336 | B2 | 9/2016 | Liu | |
| 9,545,705 | B2 | 1/2017 | Hu | |
| 2002/0166416 | A1 | 11/2002 | Hu | |
| 2006/0081092 | A1 | 4/2006 | Chen | |
| 2017/0361430 | A1 | 12/2017 | Mitcheltree | |

* cited by examiner

RATCHET TOOL WITH IMPROVED PAWL

CROSS-REFERENCE TO RELATED APPLICATIONS/INCORPORATION BY REFERENCE

This application is a continuation application of U.S. patent application Ser. No. 16/588,490, filed Sep. 30, 2019. All disclosure and subject matter, including all figures, of the '490 application are specifically incorporated by reference in this application as if set forth fully herein.

BACKGROUND

The present disclosure relates generally to an improved pawl for use in a ratchet tool. Such mechanisms are used in hand tools including ratchet wrenches and torque wrenches.

It may be desirable to reduce the size and weight of a ratchet tool while improving manufacturability and the functionality of the ratchet tool. The ratchet tool relies on the mechanical engagement of pawl teeth of a pawl with gear teeth of a ratchet gear. If the mechanical engagement is compromised, for example by a misalignment of the pawl teeth with the gear teeth, the ratchet tool may slip when torque is applied. Such slippage may result in a wear-down and reduced life of the pawl and/or ratchet gear. Thus, preventing misalignment of the pawl teeth with the gear teeth may result in improved life of the pawl and/or ratchet gear.

Improving manufacturability may be achieved by reducing the total number of parts and processes required to manufacture the ratchet tool head. Such improved manufacturability may allow a tool to be sold at a lower price, making it more desirable. A reduction of the number of parts in a tool may further reduce the size and weight of the tool. Reducing the size and weight of a ratchet tool head may make a tool more desirable as it may allow for easier operability and extended use without fatigue.

Accordingly, it is desirable to have a smaller and reduced weight ratchet tool that has improved functionality and manufacturability.

SUMMARY

A ratchet tool having an improved pawl is disclosed, substantially as illustrated by and described in connection with at least one of the figures, as set forth more completely in the claims Specifically, disclosed is an example ratchet tool that may include a head that may include a front side including a first cavity including a lower surface. The first cavity may be adapted to receive a cover plate. The ratchet tool may also include a rear side including a second cavity. The second cavity may be in communication with the first cavity such that an aperture extends between the first cavity and the second cavity. The ratchet tool may further include a ratchet gear disposed in the first cavity. The ratchet gear may include a plurality of gear teeth. The ratchet tool may additionally include a pawl disposed in the first cavity. The pawl may include a plurality of pawl teeth configured to mechanically engage in a vertical alignment with the plurality of gear teeth of the ratchet gear. The pawl may be movable between a first position in which the pawl is configured to transmit torque through the ratchet gear in a first rotational direction, and a second position in which the pawl is configured to transmit torque through the ratchet gear in a second, opposite rotational direction. The example ratchet tool may also a selector switch disposed in the second cavity. The selector switch may be configured to move the pawl between the first position and the second position. Finally, the ratchet tool may include a retaining clip configured to retain the selector switch in at least the second cavity. The retaining clip may extend into the first cavity. The pawl may include a first extended portion and a second extended portion extending from a lower end of the pawl. In such an example, at least a portion of the retaining clip may be disposed between the first extended portion and the second extended portion. The first extended portion and the second extended portion may contact the lower surface of the first cavity. Additionally, an upper end of the pawl may contact the cover plate.

In one example, the pawl of the example ratchet tool may include a plurality of pawl teeth that may extend onto the first extended portion and the second extended portion. In another example, the plurality of pawl teeth may extend from the upper end of the pawl to respective lower ends of the first extended portion and second extended portion. In an additional example, the pawl of the example ratchet tool may further include a notch including first depth in a lower portion of the notch and a second depth in an upper portion of the notch. In such an example, the first depth may be greater than the second depth. The pawl of the example ratchet tool may also include a limiting portion disposed between the lower portion of the notch and the upper portion of the notch. Further, the lower portion of the notch may be configured to engage with a spring-loaded pusher extending from a driver portion of the selector switch. Finally, the limiting portion may prevent the spring-loaded pusher from springing out of the lower portion of the notch.

In one example, the contact between the first extended portion and the second extended portion with the lower surface of the first cavity, and the contact between the upper end of the pawl with the cover plate, may maintain the vertical alignment between the pawl teeth and the gear teeth of the ratchet gear. In another example, the ratchet tool includes a layer of grease between the first extended portion and the second extended portion and the lower surface of the first cavity, and between the upper end of the pawl and the cover plate.

Also disclosed is an example ratchet tool that may include a head that may include a front side including a first cavity including a lower surface. The first cavity may be adapted to receive a cover plate. The ratchet tool may also include a rear side including a second cavity. The second cavity may be in communication with the first cavity such that an aperture extends between the first cavity and the second cavity. The ratchet tool may further include a ratchet gear disposed in the first cavity. The ratchet gear may include a plurality of gear teeth. The ratchet tool may additionally include a pawl disposed in the first cavity. The pawl may include a plurality of pawl teeth configured to mechanically engage in a vertical alignment with the plurality of gear teeth of the ratchet gear. The pawl may be movable between a first position in which the pawl is configured to transmit torque through the ratchet gear in a first rotational direction, and a second position in which the pawl is configured to transmit torque through the ratchet gear in a second, opposite rotational direction. The example ratchet tool may also a selector switch disposed in the second cavity. The selector switch maybe configured to move the pawl between the first position and the second position. Finally, the ratchet tool may include a retaining clip configured to retain the selector switch in at least the second cavity. The retaining clip may extend into the first cavity. The pawl may include a recessed portion on a lower end. In such an example, at least a portion of the retaining clip may extend into the recessed portion of the pawl. The lower end of the pawl may contact the lower surface of the first cavity. Additionally, an upper end of the pawl may contact the cover plate.

In one example, the pawl of the example ratchet tool may include a plurality of pawl teeth that extend from the upper end of the pawl to the lower end of the pawl. In another example, the contact between the lower end of the pawl with the lower surface of the first cavity and the upper end of the pawl with the cover plate, may maintain the vertical alignment between the pawl teeth and the gear teeth of the ratchet gear. In a further example, the ratchet tool may include a layer of grease between the lower end of the pawl and the lower surface of the first cavity, and between the upper end of the pawl and the cover plate.

Also disclosed is an example pawl for a ratchet tool. The pawl may include an upper end, a lower end, a front end, and a rear end. The pawl may include a plurality of pawl teeth positioned on the front end of the pawl that are configured to mechanically engage in a vertical alignment with a plurality of gear teeth of a ratchet gear. The pawl may also include a first extended portion and a second extended portion extending from the lower end of the pawl, and at least a portion of a retaining clip of a selector switch is disposed between the first extended portion and the second extended portion such that the first extended portion and the second extended portion contact a lower surface of a ratchet tool head cavity. Additionally, the upper end of the pawl may contact a ratchet tool cover plate.

In one example, the pawl may include a plurality of pawl teeth that may extend onto the first extended portion and the second extended portion. In another example, the plurality of pawl teeth may extend from the upper end of the pawl to respective lower ends of the first extended portion and second extended portion. In an additional example, the pawl may include a notch including first depth in a lower portion of the notch and a second depth in an upper portion of the notch. In such an example, the first depth may be greater than the second depth. The example pawl may also include a limiting portion disposed between the lower portion of the notch and the upper portion of the notch. The lower portion of the notch may be configured to engage with a spring-loaded pusher extending from a driver portion of the selector switch. The limiting portion may prevent the spring-loaded pusher from springing out of the lower portion of the notch. In one example, the contact between the first extended portion and the second extended portion with the lower surface of the ratchet tool head cavity, and the contact between the upper end of the pawl with the ratchet tool cover plate, may maintain the vertical alignment between the pawl teeth and the gear teeth of the ratchet gear.

Also disclosed is another example pawl for a ratchet tool. The pawl may include an upper end, a lower end, a front end, and a rear end. The pawl may include a plurality of pawl teeth positioned on the front end of the pawl that are configured to mechanically engage in a vertical alignment with a plurality of gear teeth of a ratchet gear. The pawl may include a recessed portion on the lower end of the pawl, and at least a portion of the recessed portion is configured to receive at least a portion of a retaining clip of a selector switch such that the lower end of the pawl contacts a lower surface of a ratchet tool head cavity. Additionally, the upper end of the pawl may contact a ratchet tool cover plate.

In one example, the pawl may include a plurality of pawl teeth that extend from the upper end of the pawl to the lower end of the pawl. In another example, the contact between the lower end of the pawl with the lower surface of the ratchet tool head cavity, and the contact between the upper end of the pawl with the ratchet tool cover plate, may maintain the vertical alignment between the pawl teeth and the gear teeth of the ratchet gear.

Figure 1:
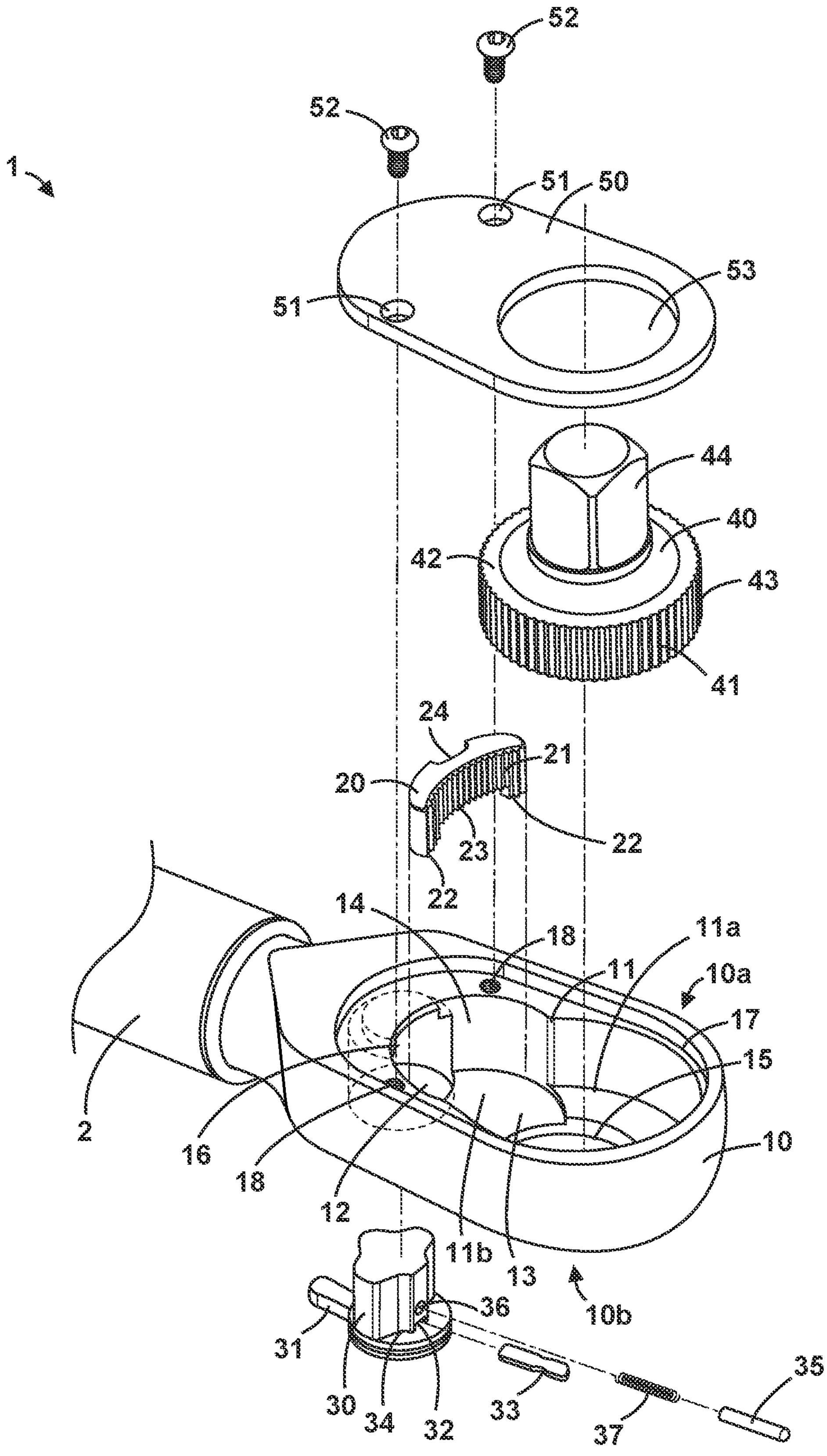
FIG. 1 illustrates an exploded perspective view of a head of a ratchet tool, in accordance with aspects of this disclosure.

The foregoing summary, as well as the following detailed description of certain techniques of the present application, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION

Parts Listing:

| Number | Description |
|---|---|
| 1 | Ratchet tool |
| 1' | Prior art ratchet tool |
| 2 | Handle |
| 10 | Head |
| 10a | Front side of head |
| 10b | Rear side of head |
| 11 | First cavity |
| 11a | Drive cavity |
| 11b | Pawl cavity |
| 12 | Second cavity |
| 13 | Lower surface of pawl cavity |
| 14 | Sidewall of pawl cavity |
| 15 | Circular recess |
| 16 | Aperture between first cavity and second cavity |
| 17 | Cover place recess |
| 18 | Cover plate screw apertures |
| 20 | Pawl |
| 20' | Prior art pawl |
| 21 | Pawl teeth |
| 22 | Extended portion |
| 23 | Recessed portion |
| 24 | Notch |
| 24a | Upper portion of the notch |
| 24b | Lower portion of the notch |
| 25 | Limiting portion |
| 30 | Selector Switch |
| 31 | Lever portion |
| 32 | Retaining clip aperture |
| 33 | Retaining clip |
| 34 | Driver portion |
| 35 | Pusher |
| 36 | Pusher aperture |
| 37 | Spring |
| 40 | Ratchet Gear |
| 41 | Gear teeth |
| 42 | Cylindrical body portion |
| 43 | Circumferential surface |
| 44 | Extended drive post |
| 45 | Bearing portion |
| 50 | Cover plate |
| 51 | Screw apertures |
| 52 | Screw |
| 53 | Circular bore |

FIG. 1 shows an exploded view of an example ratchet tool 1. Specifically, shown is a single pawl ratchet wrench that allows a user to selectively determine a torque direction. The ratchet tool 1 may include a handle 2 that integrates with a head 10. The head 10 may have a front side 10*a* and a rear side 10*b*. In one embodiment, the head 10 may include a first cavity 11 and a second cavity 12 for receiving internal and external components of the ratchet tool 1 for providing torque to a working piece (not shown) such as a socket or other tool or a fastener. For example, such components may include a pawl 20, selector switch 30, ratchet gear 40, and cover plate 50.

The first cavity 11 may be generally positioned on the front side 10*a* of the head 10 and include several portions for receiving and retaining the components therein. For example, first cavity 11 may include a generally large circular drive cavity 11*a*, for receiving the ratchet gear 40. The drive cavity 11*a* may further include a circular recess 15 for receiving a bearing portion 45 of the ratchet gear 40. The first cavity 11 may also include a pawl cavity 11*b* for receiving the pawl 20. The pawl cavity 11*b* may include a lower surface 13. The pawl cavity 11*b* may be slightly more recessed than the drive cavity 11*a*.

The pawl 20 may include pawl teeth 21 located on a front end of the pawl 20. In one embodiment the pawl 20 may have first and second extended portions 22 extending from a lower end of the pawl 20. A recessed portion 23 may be generally located between the first and second extended portions 22. In another embodiment, the recessed portion 23 may be cut directly into a lower end of the pawl 20. The pawl may include a notch 24 on a rear end of the pawl 20.

The ratchet gear 40 may have a generally cylindrical body portion 42 having gear teeth 41 (i.e., ratchet gearing) positioned on a circumferential surface 43. The ratchet gear 40 may also have an extended drive post 44. In one embodiment the extended drive post 44 is a drive square. The ratchet gear 40 may further include a bearing portion 45 to permit rotation of the ratchet gear 40 and assist in centering and retaining the ratchet gear 40 within the drive cavity 11*a*. As will be discussed in more detail below, the pawl teeth 21 engage with the gear teeth 41 to transfer torque the ratchet gear 40.

A second cavity 12 may be generally positioned on the rear side 10*b* of the head 10. The second cavity 12 may receive and retain the selector switch 30. The second cavity 12 may at least partially overlap with the first cavity 11 such that an aperture 16 extends between the first cavity 11 and second cavity 12. The aperture 16 may allow communication between the first cavity 11 and second cavity 12. In one embodiment, a driver portion 34 of the selector switch 30 may extend at least partially through the aperture 16 into the first cavity 11. The selector switch 30 may be retained in the second cavity 11 and head 10 by a retaining clip 33. The retaining clip 33 may be disposed in a retaining clip aperture 32 located on the driver portion 34. When installed, the retaining clip 33 may overlap with the lower surface 13 of the first cavity 11 thereby preventing the selector switch 30 from falling out of the second cavity 12. The selector switch 30 may also include a pusher aperture 36 for receiving a spring 37 and pusher 35. The spring 37 may bias the pusher 35 outward from the pusher aperture 36. The spring loaded pusher 35 may engage with the pawl 20. Specifically, the spring-loaded pusher 35 may be biased outward by the spring 37 to engage with the notch 24 of the pawl 20.

Once the ratchet tool 1 is assembled, a cover plate 50 may be secured to a cover plate recess 17 of the ratchet head 10 to cover the first cavity 11. The cover plate 50 may be secured by screws 52 that thread into screw apertures 18 positioned in the cover plate recess 17 of the ratchet head 10. The cover plate may include a circular bore 53 through which the extend drive post 44 projects for operative engagement with a working piece.

As may be evident from the example ratchet head 10 shown in FIG. 1, the present disclosure contemplates a stacked packaging of components. Further, the example ratchet head 1 may be manufactured using fewer components and using simpler manufacturing methods. For example, rather than use a complex means of retention the selector switch 30 is retained in the head 10 by a retention clip 33 that stacks with the pawl 20 to save vertical space. Further, the first cavity 11 and second cavity 12 may formed from relatively simple milling processes, thereby simplifying manufacture and reducing cost.

Figure 2:
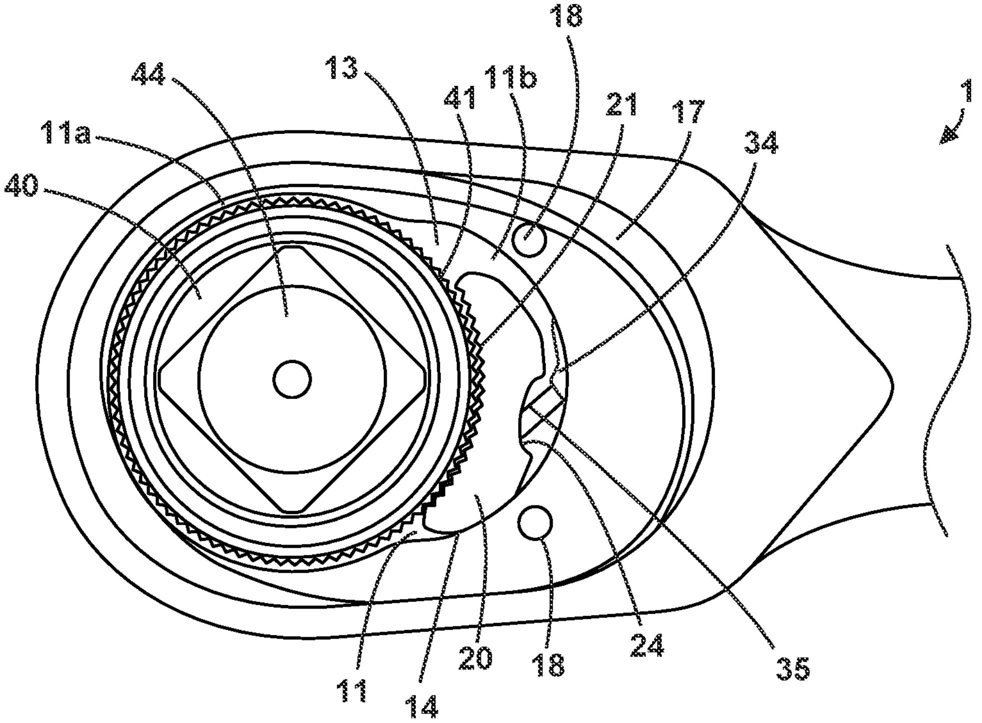
FIG. 2 illustrates an enlarged top plan view of an assembled ratchet head, showing the pawl in a first position, in accordance with aspects of this disclosure.
Figure 3:
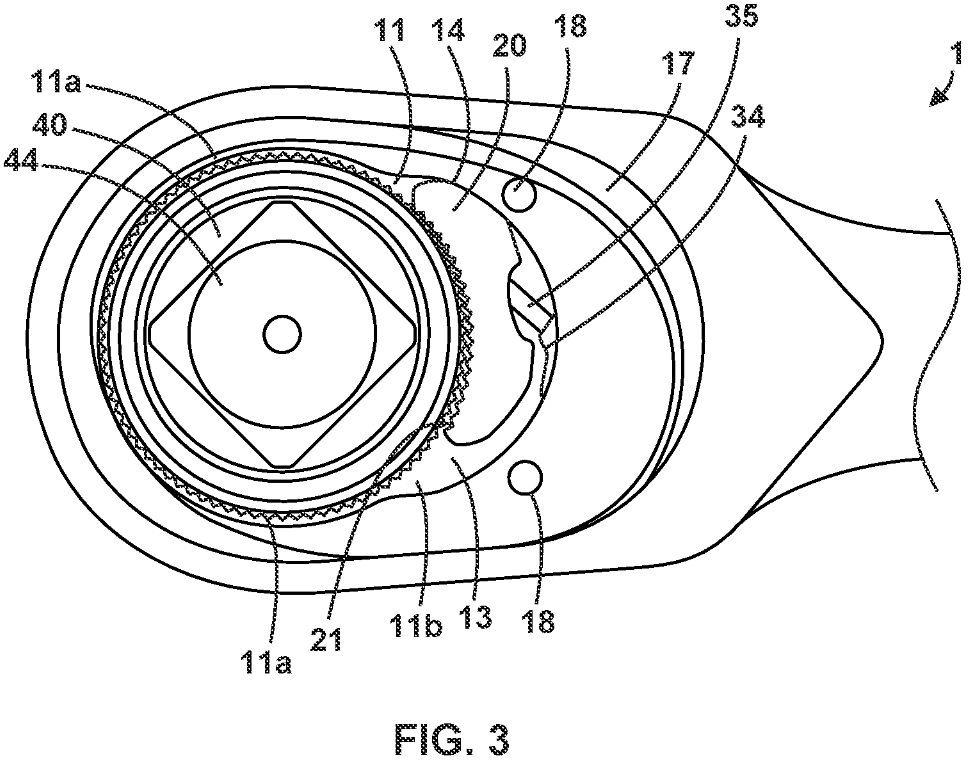
FIG. 3 illustrates an enlarged top plan view of an assembled ratchet head, showing the pawl in a second position, in accordance with aspects of this disclosure.

As is shown in FIGS. 2 and 3, the pawl 20 may slide to either side of the pawl cavity 11*b* laterally with respect to the ratchet gear 40 between a first position and a second position in which the pawl is wedged between a sidewall 14 of the first cavity 11 (specifically, pawl cavity 11*b*) and the ratchet gear 40. For example, in FIG. 2 the pawl 20 is positioned in a first position in which the pawl 20 transmits torque through the ratchet gear 40 in a first rotational direction. Conversely, in FIG. 3 the pawl 20 is positioned in a second position in which the pawl 20 transmits torque through the ratchet gear 40 in a second, opposite rotational direction.

Specifically, as is shown for example in FIG. 2, in the first position, the selector switch 30 is rotated to its most clockwise position, and the pawl 20 is wedged between the ratchet gear 40 and a sidewall 14 of the pawl cavity 11*b* in a first position. The spring 37 may push the pusher 35 forward so that the pusher 35 engages with the notch 24, and thereby biases the pawl 20 to the first wedged position. In such an example, if torque is applied to the handle 2 in clockwise direction when a socket on the extension drive post 43 engages a work piece, the sidewall 14 of the pawl cavity 11*b* pushes pawl teeth 21 of the pawl 20 against opposing gear teeth 41 of the ratchet gear 40. In such an embodiment, the pawl 20 remains wedged between the ratchet gear 40 and the sidewall 14 of the pawl cavity 11*b*, and the force applied from an operator's hand to the pawl 20 is therefore applied in the clockwise direction to the work piece through the ratchet gear 40.

Likewise, as is shown for example in FIG. 3, in the second position, the selector switch 30 is rotated to its most counter-clockwise position, and the pawl 20 is wedged between the ratchet gear 40 and an opposing sidewall 14 of the pawl cavity 11*b* in a second position. The spring 37 may push the pusher 35 forward so that the pusher 35 engages with the notch 24, and thereby biases the pawl 20 to the second wedged position. In such an example, if torque is applied to the handle 2 in counter-clockwise direction when a socket on the extension drive post 43 engages a work piece, the sidewall 14 of the pawl cavity 11*b* pushes pawl teeth 21 of the pawl 20 against opposing gear teeth 41 of the ratchet gear 40. In such an embodiment, the pawl 20 remains wedged between the ratchet gear 40 and the sidewall 14 of the pawl cavity 11*b*, and the force applied from an operator's hand to the pawl 20 is therefore applied in the counter-clockwise direction to the work piece through the ratchet gear 40.

Figure 4:
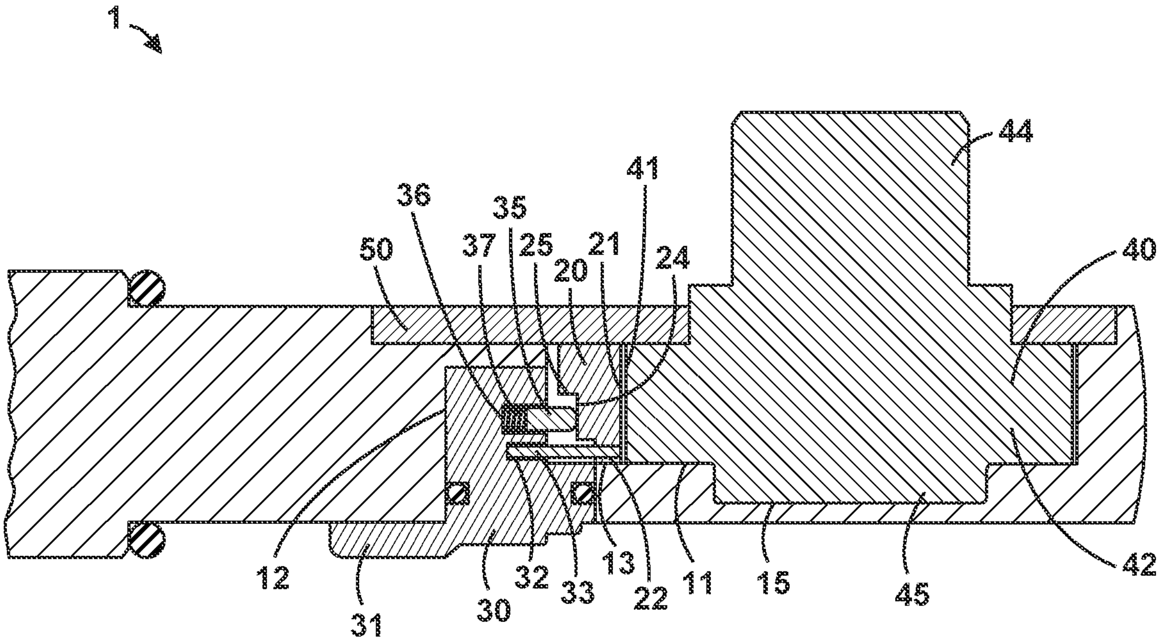
FIG. 4 illustrates an enlarged cross-sectional view of the assembled ratchet head, in accordance with aspects of this disclosure.

FIG. 4 shows an example cross section of the ratchet tool 1 showing the mechanical engagement of the pawl 20 with the ratchet gear 40, selector switch 30, and cover plate 50. Specifically, as discussed above, the spring-loaded pusher 35 biases the pawl 20 towards the ratchet gear 40. In one embodiment, the pusher 33 engages with notch 24. In such an embodiment, a limiting portion 25 may prevent the pusher 35 from springing out of notch 24. Further, as can be seen, the pawl teeth 21 are mechanically engaged in a vertical alignment with the gear teeth 41. A lower end of the pawl 20 (via extended portions 22) contacts the lower surface 13, and an upper end of the pawl 20 contacts the cover plate 50. As utilized herein, the term "contact" means direct contact between the two components, indirect contact in which a layer of lubricant or grease is disposed between the two components, or contact such that movement is prevented in the direction of the contact. As a result, of the contact between the lower portion of the pawl 20 with the lower surface 13 and the upper portion of the pawl 20 with the cover plate 50, the pawl 20 is substantially prevented from moving or shifting in a vertical direction in the pawl cavity 11*b*. Likewise, the pawl is unable to rotated about the retaining clip 33 disposed between the extended portions 22 in the recessed portion 23. As a result, the mechanical engagement between the pawl teeth 21 and gear teeth 41 is improved. Such improved mechanical engagement may contribute to less slippage during operation, and increased life of the pawl 20 and ratchet gear 40. Finally, as will be appreciated, the stacking of components such as the retention clip 33 and pawl 20, allows for a smaller more light-weight ratchet head 10 that improves the mechanical engagement between the pawl 20 and ratchet gear 40.

Figure 5:
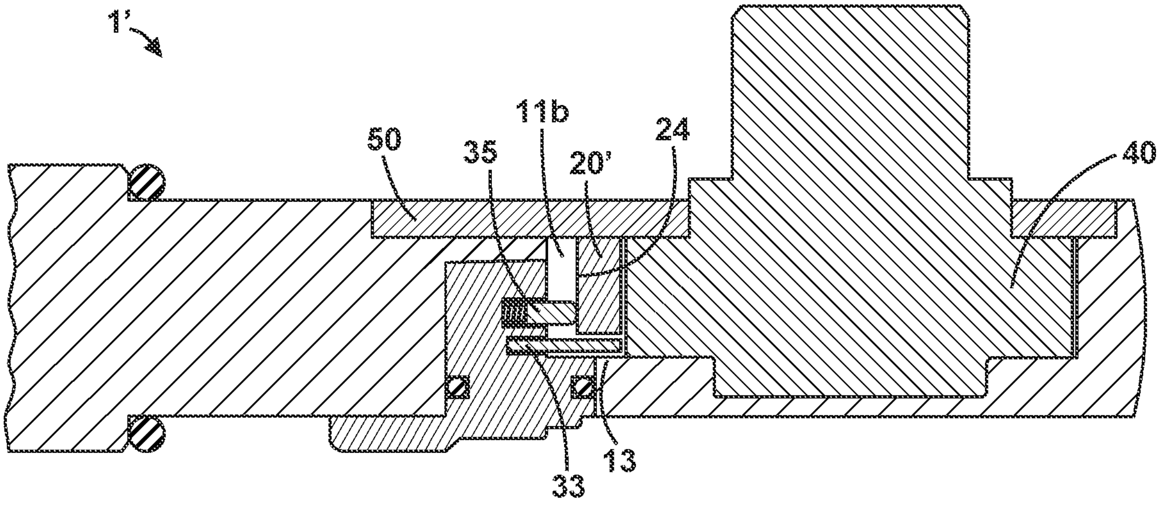
FIG. 5 (Prior Art)
FIG. 5 illustrates an enlarged cross-section view of an assembled ratchet head, showing an exemplary prior art pawl.

In contrast, FIG. 5 shows the example prior art ratchet tool 1' using a traditional "floating" pawl 20'. The traditional pawl is not vertically restricted by a cover plate 50 and lower surface 13 of the pawl cavity 11*b*. As a result, the traditional pawl 20' is able to shift vertically within the pawl cavity 11*b* bringing it out of vertical alignment with the ratchet gear 40. Additionally, because the traditional pawl 20' is not restricted in the pawl cavity 11*b*, it is able to rock and or rotate about the retaining clip 33. Such rotation may result in a partial alignment of the pawl 20' with the ratchet gear 40 leading to slippage, and reduced life, of the pawl 20' and ratchet gear 40. Finally, the traditional pawl 20' does not have a limiting portion on the notch 24. As a result the pusher 35 may spring out of engagement with the notch 24 of the pawl 20'.

Figure 6:
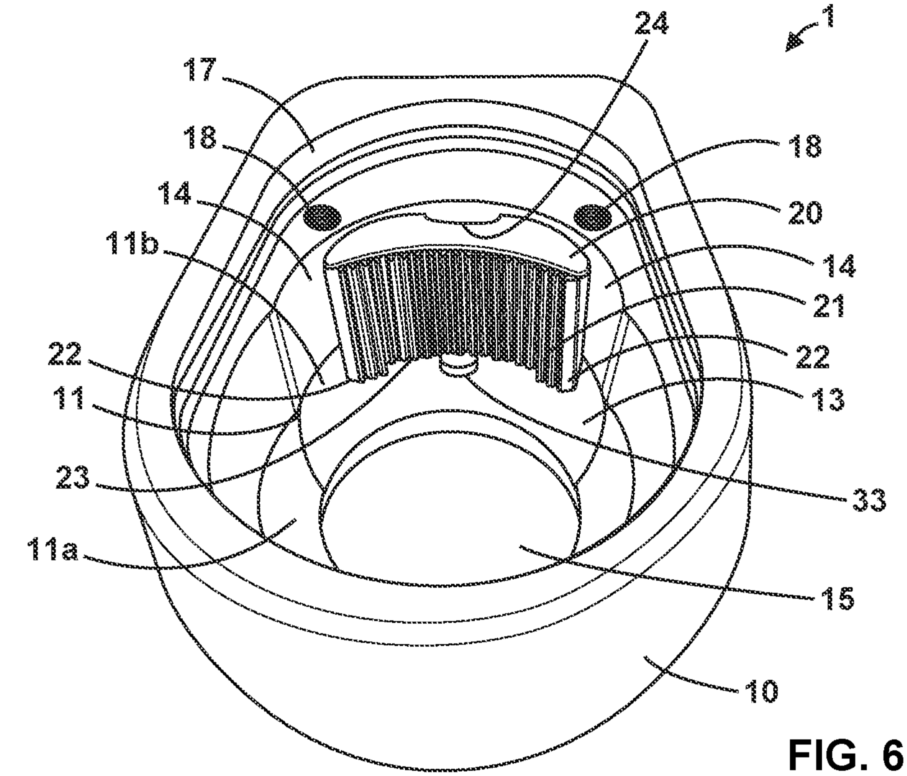
FIG. 6 illustrates a top perspective view of a cavity in a ratchet tool, showing a pawl and retaining clip, in accordance with aspects of this disclosure.
Figure 7:
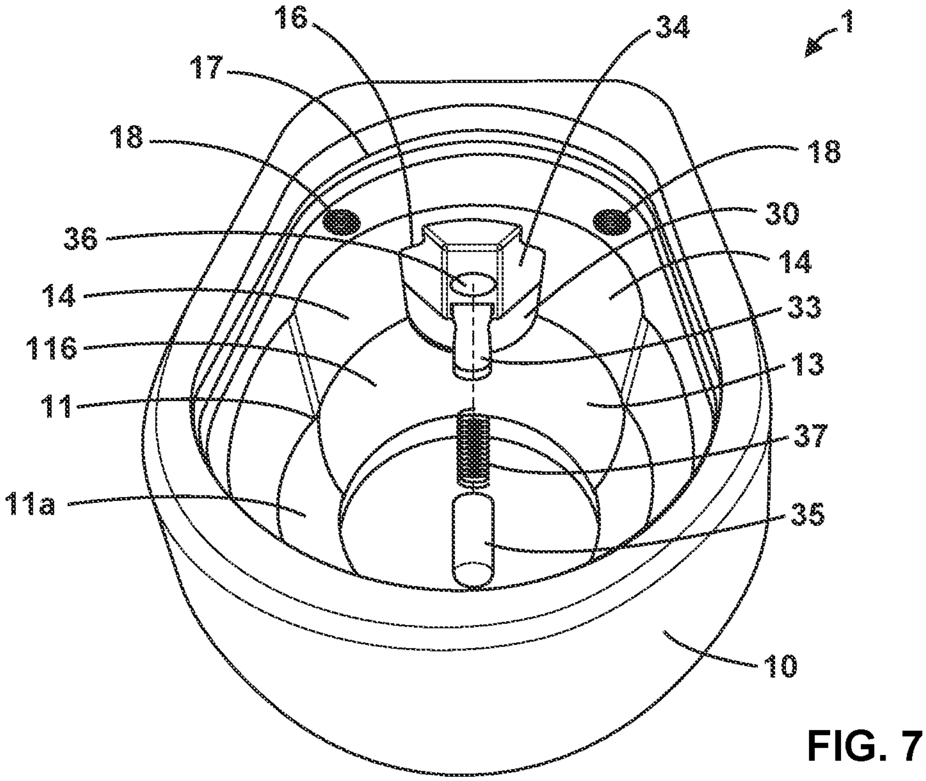
FIG. 7 illustrates a top perspective view of a cavity in a ratchet tool, showing driver portion of a selector switch, spring-loaded pusher, and retaining clip, in accordance with aspects of this disclosure.
Figure 8:
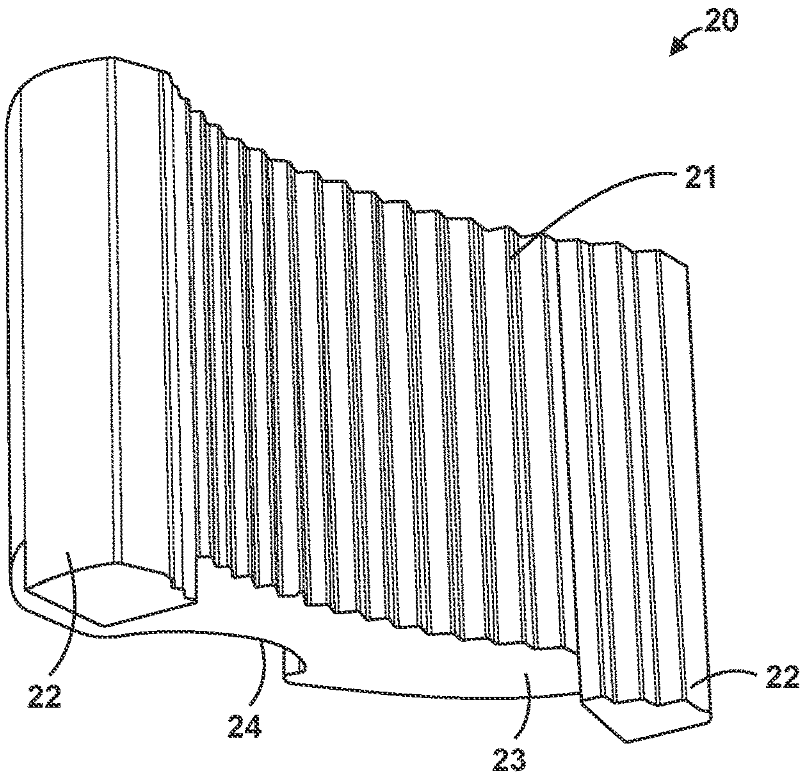
FIG. 8 illustrates a bottom-front perspective view of a pawl, in accordance with aspects of this disclosure.
Figure 9:
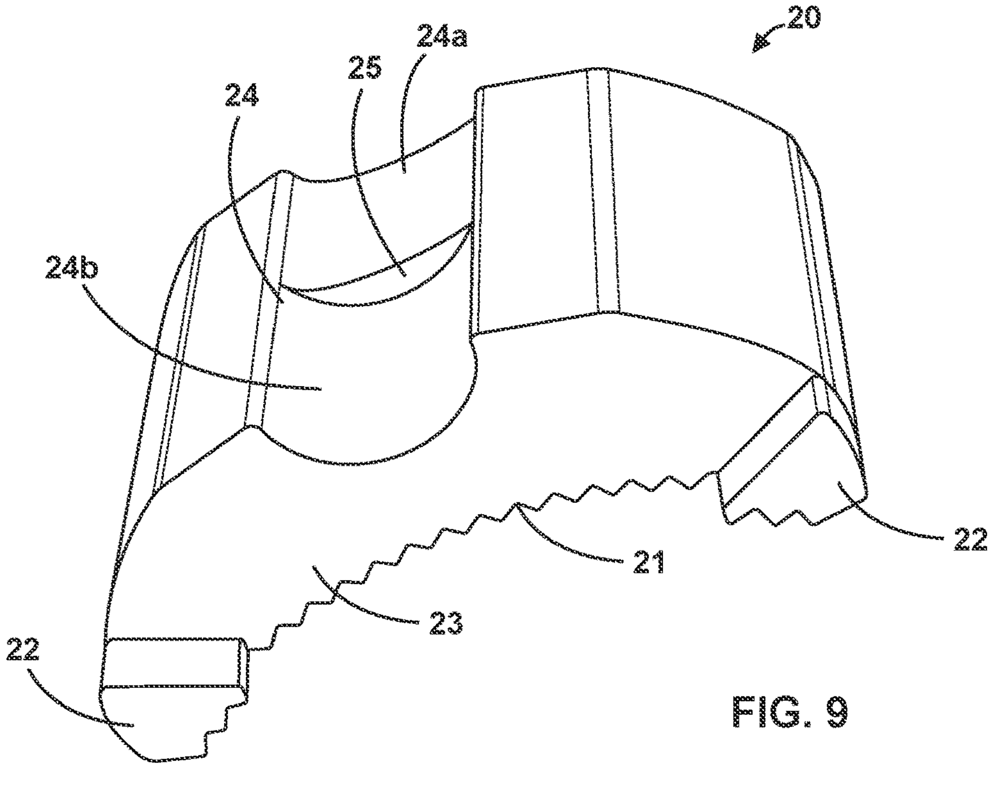
FIG. 9 illustrates a bottom-rear perspective view of a pawl, in accordance with aspects of this disclosure.
Figure 10:
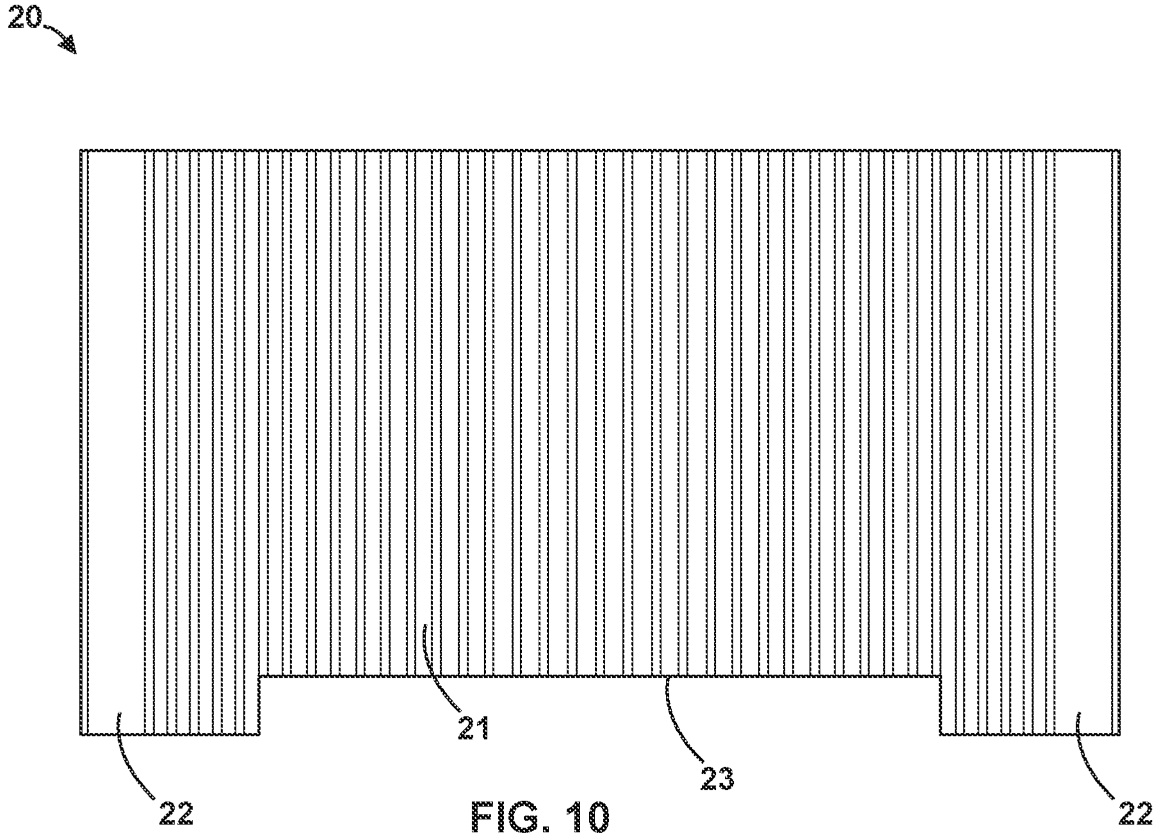
FIG. 10 illustrates a front elevation view of a pawl, in accordance with aspects of this disclosure.
Figure 11:
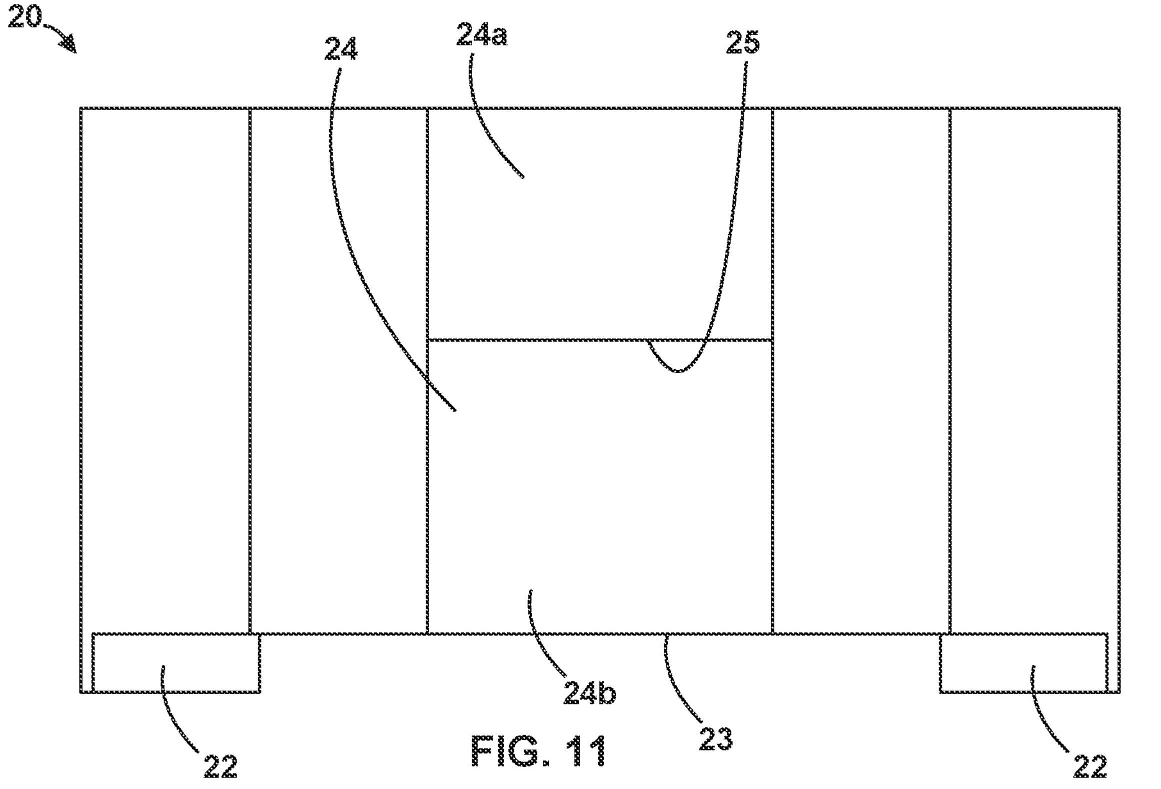
FIG. 11 illustrates a rear elevation view of a pawl, in accordance with aspects of this disclosure.
Figure 12:
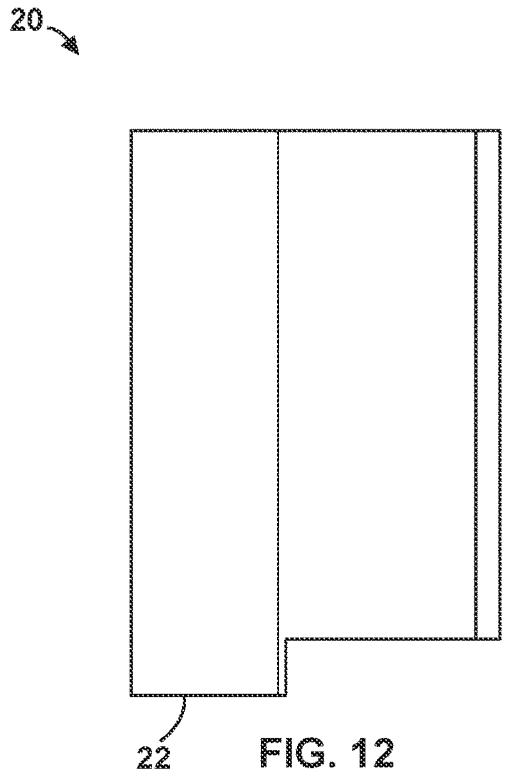
FIG. 12 illustrates a side elevation view of a pawl, in accordance with aspects of this disclosure.
Figure 13:
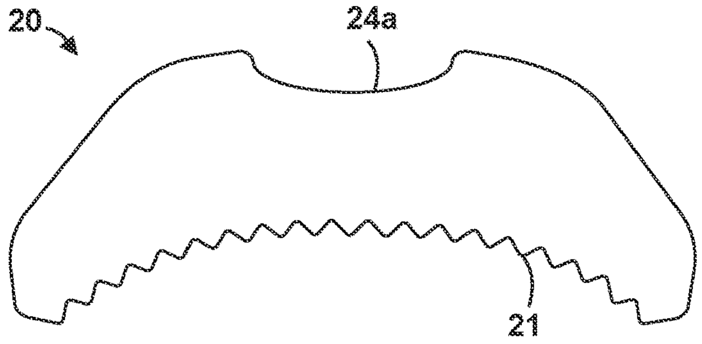
FIG. 13 illustrates a top plan view of a pawl, in accordance with aspects of this disclosure.
Figure 14:
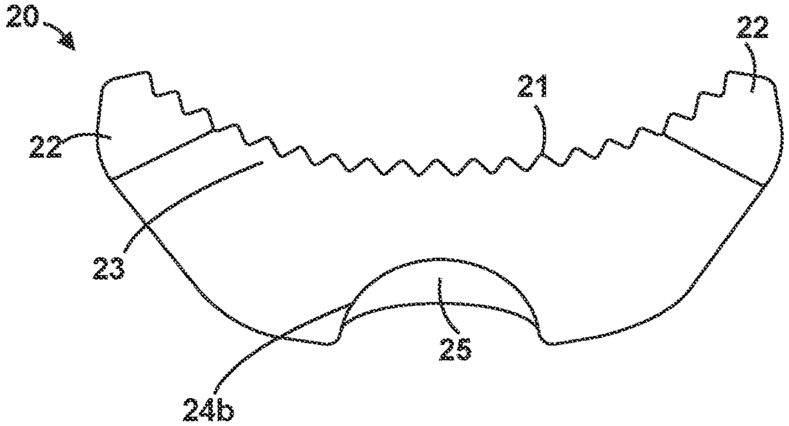
FIG. 14 illustrates a bottom plan view of a pawl, in accordance with aspects of this disclosure.

FIGS. 6 and 7 are example perspective views of the ratchet head 10 looking into the first cavity 11, showing the preferred stacked packaging of components contemplated by the present disclosure. In both FIGS. 6 and 7, the ratchet gear 40 has been removed for clarity of illustration. For example, FIG. 6 shows the pawl 20 positioned on the lower surface 13 and against the sidewall 14 of the first cavity 11 (specifically, pawl cavity 11*b*). The pawl 20 is substantially the same height as the pawl cavity 11*b*. Disposed in and extending through the recess 23 (positioned between first and second extended portions 22) is the retaining clip 33. In such an embodiment, the pawl can move laterally to either the first position or second position, as described above, and not move vertically and/or rotate about the retention clip 33.

FIG. 7, shows an example ratchet head 10 further with the pawl 20 removed for clarity of illustration. Specifically, FIG. 7 shows an example aperture 16 extending between first cavity 11 and second cavity 12. FIG. 7 also shows an example selector switch 30 in a neutral position with a partially exploded pusher 35 and spring 37. As is shown, the example retention clip 33 extends beyond the selector switch 30 and second cavity 12 to overlap with the first cavity 11 and lower surface 13. Such overlap retains the selector switch 30 in the second cavity 12 and the ratchet head 10. FIGS. 6 and 7 are examples of the stacked packaging of components that allow for a smaller, more light-weight ratchet.

FIGS. 8-14 depict various views of an example improved ratchet pawl 20. The pawl 20 may be made of any suitable material including metal, ceramic, polymer, etc. For example, the pawl 20 may be machined from a single piece of metal. In one embodiment, the pawl may have an upper end, a lower end, a front end, and a rear end. The pawl 20 may be either a fine tooth pawl or a course tooth pawl. The pawl 20 may include pawl teeth 21, at least one extended portion 22, a recessed portion 23, and notch 24.

The pawl may have pawl teeth 21 positioned on the front end of the pawl 20. The pawl teeth 21 may be formed to mechanically engage with ratchet teeth 41. The pawl teeth 21 may cover the entire front end of the pawl 20 extending from the upper end of the pawl 20 to the lower end of the pawl 20. The pawl teeth 21 may extend onto the at least one extended portions 22. Thus, in such an embodiment the pawl teeth 21 span across a single continuous surface (i.e., front end of the pawl 20), including the front surface of the one or more extended portions 22. Such a configuration is advantageous because the total meshed area of the pawl teeth 21 is maximized yielding higher strength. Thus, by providing pawl teeth 21 on the entire height of the pawl 20, the interaction length (moment arm) is longer and there will be less stress on the pawl 20 during operation. The longer length of the pawl teeth 20 extending onto the extended portions 22 may also cause the pawl teeth 21 to align with higher accuracy.

In one embodiment, the pawl 20 includes first and second extended portions 22. Greater or fewer number of extended portions 22 are possible. The pawl 20 may further include a recessed portion 23 positioned generally between the first and second extended portions 22. The height of the recessed portion 23 may be configured to be at least slightly greater than the height of a retaining clip 33. In such an embodiment, if the pawl 20 were positioned on a flat surface, for example lower surface 13, such that the first and second extended portions 22 contact the surface, a retention clip 33 could slide without interference in and out of recess portion 23.

As was discussed above with reference to FIG. 4, the extended portion(s) 22 may stabilize the pawl 20 inside the first cavity 11 (specifically, the pawl cavity 11*b*) at the head of the ratchet. The extended portion(s) 22 stabilize the pawl 20 by increasing the overall height of the pawl 20 to substantially the same height as the pawl cavity 11*b*. Such a close alignment of the pawl height with the height of the pawl cavity 11*b* may help prevent vertical movement and/or rotation of the pawl 20 in the pawl cavity 11*b*. As a result, the pawl 20 is unable to rotate within the pawl cavity 11*b*.

By stabilizing the pawl 20, the pawl 20 only engages with the ratchet gear 40 when the pawl 20 is completely positioned in either the first position or the second position as described above, yielding longer life. Additionally, the stabilization of the pawl 20 may cause the pawl teeth 21 and the gear teeth 41 to be consistently and properly vertically aligned so that both sets of teeth mesh fully. Such a vertical alignment prevents both the pawl teeth 21 and the gear teeth 41 from being damaged and/or rounded off.

Figure 15:
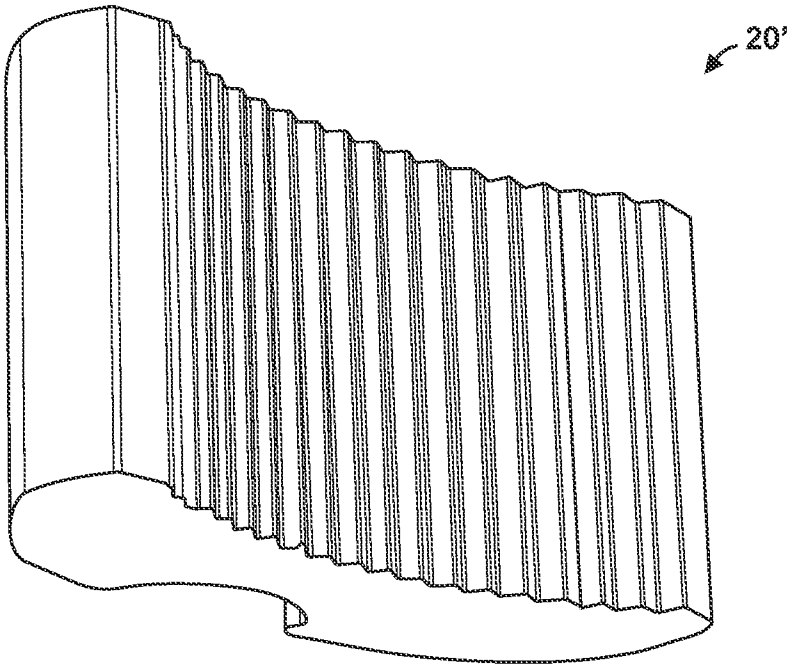
FIG. 15 (Prior Art)
FIG. 15 illustrates a bottom-front perspective view of an exemplary prior art pawl.
Figure 16:
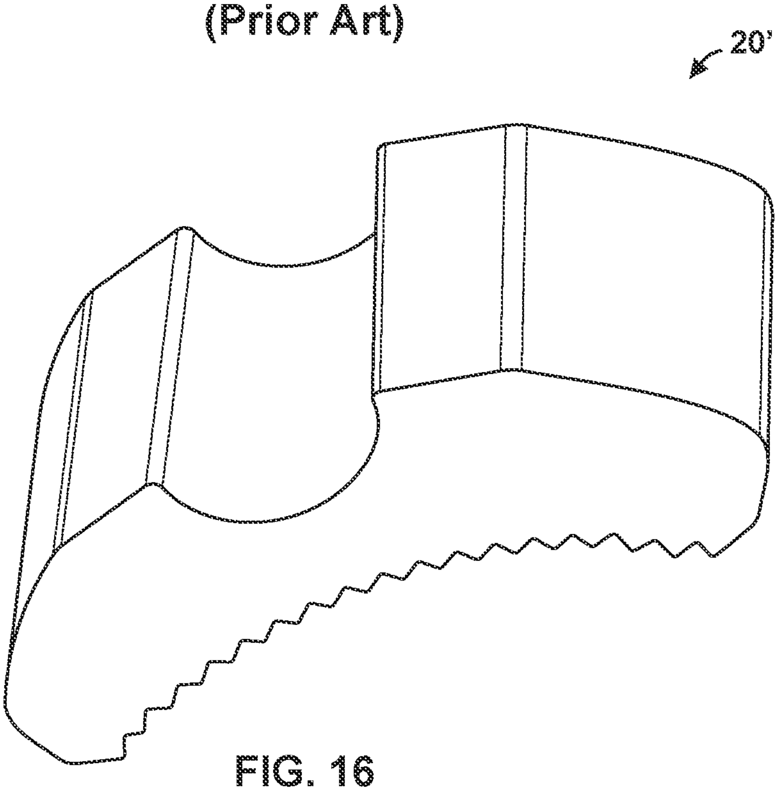
FIG. 16 (Prior Art)
FIG. 16 illustrates a bottom-rear perspective view of an exemplary prior art pawl.

By contrast, a prior art pawl 20' as pictured in FIGS. 5, 15, and 16, does not have substantially the same height as a pawl cavity 11*b*. As a result, the prior art pawls 20' are able to shift vertically and/or rotate about the retaining clip 33 within the pawl cavity 11*b*. Such vertical shifting and/or rotation may result in a misalignment of the pawl teeth with the gear teeth. Additionally, if the pawl 20' is not fully positioned in a first or second position, as described above, the pawl 20' may partially mechanically engage with the ratchet gear 40. Such partial engagement may result in slippage and/or wear on the pawl teeth and/or gear teeth. Additionally, the overall yield strength may be reduced in a pawl 20' that is not seated properly.

While, the pawl depicted in FIGS. 15 and 16 could be envisioned in a pawl cavity not containing a retaining clip 33, such that a bottom end of the prior art pawl 20' contacts a lower surface of the pawl cavity and an upper surface of the prior art pawl 20' contacts a cover plate (not shown), such an embodiment would not enable the space and weight saving stacked packaging of the ratchet tool head contemplated by the present disclosure. For example, in such an embodiment the selector switch would require additional components and manufacturing processes to be retained within the ratchet head. Such additional components and processes would result in a less desirable heavier and bulkier ratchet.

Referring again to FIGS. 8-14, the pawl 20 may also include a notch 24 positioned on a rear end of the pawl 20. The notch 24 may include an upper portion 24*a* and lower portion 24*b*, as is shown for example in FIG. 9. The upper portion 24*a* of the notch 24 may include a first depth and the lower portion 24*b* may include a second depth. In one embodiment the second depth is greater than the first depth. In such an embodiment a limiting portion 25 spans between the lower portion 24*b* and the upper portion 24*a*. The limiting portion 25 may prevent the spring-loaded pusher 35 from springing out of the lower portion 24*b* of the notch 24 ensuring that the pusher 35 stays engaged with correct part (i.e., lower portion 24*b* of notch 24) of the pawl 20. The added material in the thicker upper portion 24 may contribute to increased pawl strength. In contrast, the example prior art pawls 20' depicted in FIGS. 15 and 16 have a single depth notch. As a result, a pusher could spring out of the notch and cause a failure of the ratchet.

It will be understood by those skilled in the art that various changes may be made and equivalents may be substituted without departing from the scope of the novel techniques disclosed in this application. In addition, many modifications may be made to adapt a particular situation or material to the teachings of the novel techniques without departing from its scope. Therefore, it is intended that the novel techniques not be limited to the particular techniques disclosed, but that they will include all techniques falling within the scope of the appended claims.

The invention claimed is:

1. A ratchet tool comprising:
a head including:
- a ratchet gear disposed in the head, wherein the ratchet gear includes a plurality of gear teeth;
- a single-piece pawl disposed in the head, wherein the pawl includes a plurality of pawl teeth configured to mechanically engage with the plurality of gear teeth of the ratchet gear;
- a selector switch disposed in the head and configured to move the pawl between a first position and a second position, wherein the selector switch includes a retaining clip aperture and a pusher aperture for receiving a pusher configured to engage the pawl; and
- a retaining clip at least partially disposed in the retaining clip aperture and configured to retain the selector switch in the head;
- wherein:
  - the pawl includes a first extended portion and a second extended portion extending from a lower end of the pawl and defining a recess between the lower end of the pawl, the first extended portion, and the second extended portion, wherein the recess extends from a front end of the pawl to a rear end of the pawl; and
  - at least a portion of the retaining clip is disposed in the recess and between the first extended portion and the second extended portion.

2. The ratchet tool of claim 1, wherein the plurality of pawl teeth extend onto the first extended portion and the second extended portion.

3. The ratchet tool of claim 2, wherein the plurality of pawl teeth extend from an upper end of the pawl to respective lower ends of the first extended portion and second extended portion.

4. The ratchet tool of claim 1, wherein the single-piece pawl further comprises a notch including a first depth in a lower portion of the notch and a second depth in an upper portion of the notch, wherein:
- the first depth is greater than the second depth;
- a limiting portion is disposed between the lower portion of the notch and the upper portion of the notch;

the lower portion of the notch is configured to engage with a spring-loaded pusher extending from a driver portion of the selector switch; and the limiting portion prevents the spring-loaded pusher from springing out of the lower portion of the notch.

5. The ratchet tool of claim 1, further comprising:

a cavity disposed in the head, the cavity including a lower surface; and a cover plate attached to the head;

wherein the first extended portion and the second extended portion contacts the lower surface of the cavity, and an upper end of the pawl contacts the cover plate such that vertical alignment is maintained between the plurality of pawl teeth and the gear teeth of the ratchet gear.

6. The ratchet tool of claim 5, further comprising a layer of grease between the first extended portion and the second extended portion and the lower surface of the cavity, and between the upper end of the pawl and the cover plate.

7. A ratchet tool comprising:

a head including:

a ratchet gear disposed in the head, wherein the ratchet gear includes a plurality of gear teeth;

a single-piece pawl disposed in the head, wherein the pawl includes a plurality of pawl teeth configured to mechanically engage with the plurality of gear teeth of the ratchet gear;

a selector switch disposed in the head and configured to move the pawl between a first position and a second position, wherein the selector switch includes a retaining clip aperture and a pusher aperture for receiving a pusher configured to engage the pawl; and a retaining clip at least partially disposed in the retaining clip aperture and configured to retain the selector switch in the head;

wherein:

the pawl includes a recessed portion, the recessed portion including a recessed surface that is offset from a lower end of the pawl, wherein the recessed portion extends from a front end of the pawl to a rear end of the pawl;

at least a portion of the retaining clip extends into the recessed portion of the pawl;

wherein the plurality of pawl teeth extend from an upper end of the pawl to the lower end of the pawl.

8. The ratchet tool of claim 7, wherein the pawl further comprises a notch including a first depth in a lower portion of the notch and a second depth in an upper portion of the notch, wherein:

the first depth is greater than the second depth;

a limiting portion is disposed between the lower portion of the notch and the upper portion of the notch;

the lower portion of the notch is configured to engage with a spring-loaded pusher extending from a driver portion of the selector switch; and the limiting portion prevents the spring-loaded pusher from springing out of the lower portion of the notch.

9. The ratchet tool of claim 7, further comprising:

a cavity disposed in the head, the cavity including a lower surface; and a cover plate attached to the head;

wherein the lower end of the pawl contacts the lower surface of the cavity and the upper end of the pawl contacts the cover plate, such that vertical alignment is maintained between the plurality of pawl teeth and the gear teeth of the ratchet gear.

10. The ratchet tool of claim 9, further comprising a layer of grease between the lower end of the pawl and the lower surface of the cavity, and between the upper end of the pawl and the cover plate.

11. A ratchet tool comprising:

a head including:

a ratchet gear disposed in the head, wherein the ratchet gear includes a plurality of gear teeth;

a single-piece pawl disposed in the head, the pawl comprising:

a first extended portion extending from a lower end of the pawl;

a second extended portion extending from the lower end of the pawl;

a recess defined by the lower end of the pawl, the first extended portion, and the second extended portion, wherein the recess extends from a front end of the pawl to a rear end of the pawl; and a plurality of pawl teeth extending from an upper end of the pawl to the lower end of the pawl and onto the first extended portion and the second extended portion, wherein the pawl teeth are configured to mechanically engage with the plurality of gear teeth of the ratchet gear; and a selector switch disposed in the head and configured to move the pawl between a first position and a second position, wherein the selector switch includes a retaining clip aperture and a pusher aperture for receiving a pusher configured to engage the pawl; and a retaining clip at least partially disposed in the retaining clip aperture of the selector switch and configured to retain the selector switch in the head;

wherein at least a portion of the retaining clip extends into the recess of the pawl and between the first extended portion and the second extended portion.

12. The ratchet tool of claim 11, wherein the pawl further comprises a notch including a first depth in a lower portion of the notch and a second depth in an upper portion of the notch, wherein:

the first depth is greater than the second depth;

a limiting portion is disposed between the lower portion of the notch and the upper portion of the notch;

the lower portion of the notch is configured to engage with a spring-loaded pusher extending from a driver portion of the selector switch; and the limiting portion prevents the spring-loaded pusher from springing out of the lower portion of the notch.

* * * * *